United States Patent
Hainsworth et al.

[19]

[11] Patent Number: 5,850,991
[45] Date of Patent: Dec. 22, 1998

[54] MECHANICAL EMERGENCY DUAL-RELEASE MECHANISM FOR AN EXTERNAL CARGO HOOK SYSTEM

[75] Inventors: Barton J. Hainsworth; Marc R. Poland, both of Shelton, Conn.

[73] Assignee: Sikorsky Aircraft Corporation, Stratford, Conn.

[21] Appl. No.: 942,764

[22] Filed: Oct. 2, 1997

[51] Int. Cl.$^6$ .......................... B64D 01/08; B64D 09/00; B64D 01/12
[52] U.S. Cl. ...................... 244/137.1; 244/137.4
[58] Field of Search ............... 244/138 R, 137.1, 244/137.2, 137.4, 1 TD

[56] References Cited

U.S. PATENT DOCUMENTS

| | | | |
|---|---|---|---|
| 1,332,345 | 3/1920 | Kenyon | 244/229 |
| 3,957,233 | 5/1976 | Adams | 244/137.1 |
| 3,957,234 | 5/1976 | Mulvey | 244/137.1 |
| 4,598,882 | 7/1986 | Opdahl | 244/1 TD |
| 5,158,247 | 10/1992 | Ferrier | 244/137.1 |
| 5,465,925 | 11/1995 | Connolly et al. | 244/137.1 |
| 5,499,785 | 3/1996 | Roberts et al. | 244/137.1 |

Primary Examiner—V. Lissi Mojica
Attorney, Agent, or Firm—Terrance J. Radke

[57] ABSTRACT

One embodiment of a mechanical emergency dual-release mechanism for use in combination with a helicopter external cargo hook system that includes a cargo hook assembly that is operative to jettison an externally-attached cargo includes an interface member for mounting the dual-release mechanism in rigid combination with the cargo hook assembly, a pulley axle mounted in rigid combination with the interface member, a cockpit pulley assembly mounted in rotatable combination with the pulley axle, a cabin pulley assembly mounted in rotatable combination with the pulley axle, and a displacement transfer member that operatively interconnects the cockpit pulley assembly and the cabin pulley assembly. The cabin pulley assembly is functionally interconnected to the cargo hook assembly and operative in response to a mechanical stimulus generated by means of the cockpit pulley assembly or the cabin pulley assembly to activate the cargo hook assembly to jettison the externally-attached cargo.

10 Claims, 6 Drawing Sheets

MECHANICAL EMERGENCY DUAL-RELEASE MECHANISM FOR AN EXTERNAL CARGO HOOK SYSTEM

TECHNICAL FIELD

The present invention is directed to external cargo hook systems for helicopters, and more particularly, to a mechanical emergency dual-release mechanism for helicopter external cargo hook systems that is operative to allow jettisoning of externally-attached cargo by either the pilot/co-pilot or a crew member.

BACKGROUND ART

The transport of load packages (cargo and/or passengers) is, by definition, the primary function of a utility helicopter. Typically, a utility helicopter is preconfigured, or may be reconfigured as required, to perform such a cargo-transport function. For example, a utility helicopter may be configured solely for the transport of cargo, or alternatively, may be preconfigured primarily for the transport of passengers, with the capability to be readily reconfigured for the transport of cargo (e.g., by removing interior seating).

It is often more practical, as well as posing less of a risk, to utilize only the interior of a utility helicopter for the cargo-transport function. The weight and balance of the load package can be suitably distributed within the interior of the helicopter, thereby ensuring that the flight operations of the helicopter are conducted within the approved flight envelope of the helicopter. An internally-transported load package is shielded against adverse environmental conditions by the helicopter airframe. In addition, the pilot is not required to extend his situational awareness, which thereby increases pilot workload, during flight operations to accommodate cargo that temporarily alters the external spatial envelope of the helicopter.

Utilizing only the interior of a utility helicopter for the cargo-transport function, however, while having advantages of the ilk described in the preceding paragraph, does tend to circumscribe the overall usefulness of the utility helicopter. The cargo-carrying capability of the helicopter is limited to cargo having overall external dimensions that are compatible with the dimensions of the helicopter cargo door(s), i.e., that can be loaded through the cargo door(s). Pragmatically, therefore, oversized cargo (external dimensions greater than the cargo door dimensions) or cargo having unusual external dimensions/configurations cannot be transported internally within the helicopter.

To enhance the versatility of a utility helicopter for the cargo-carrying function, the helicopter may be equipped with an external cargo hook system that facilitates the external attachment of cargo in combination with the helicopter. The external cargo hook system allows oversized cargo or cargo having unusual external dimensions/configurations to be readily transported by the helicopter. While an external cargo hook system does enhance the versatility of the helicopter, it also poses some considerations that impact the overall design of the helicopter.

First and foremost, there are some circumstances when flight safety concerns dictate that the externally-attached cargo being transported by a helicopter be capable of being immediately jettisoned. For example, the loss of an engine (one engine inoperative condition) during the transport of externally-attached cargo constitutes an emergency situation which necessitates that such cargo be immediately jettisoned. Secondly, externally-attached cargo is typically suspended some distance below the helicopter such that the helicopter and its externally-attached cargo in effect define a pendulum system, with the helicopter acting as the fixed support for such a pendulum system. Oscillations induced in the externally-attached cargo can adversely affect the control stability of the helicopter, and, if such oscillations cannot be controlled, an emergency situation exists and the externally-attached cargo must be capable of being immediately jettisoned.

The foregoing considerations dictate that an emergency cargo-release system be incorporated in combination with the external cargo hook system to allow any cargo that is attached to the external cargo hook system to be capable of being immediately jettisoned in an emergency situation. Conventionally, the primary emergency cargo-release system for a helicopter that includes an external cargo hook system is an electrical system that is accessible to the pilot/co-pilot, allowing the pilot/co-pilot to actuate the system in an emergency situation to generate a control signal that causes the external cargo hook system to jettison the externally-attached cargo.

In view of the redundancy requirements that are generally imposed in the aerospace industry with respect to any system that directly affects flight safety, an external cargo hook system will also typically include a backup emergency cargo-release device. Such a backup emergency cargo-release device is generally a mechanically operated device (to ensure availability in the event of a helicopter power system failure that adversely impacts the operation of the primary emergency cargo-release system) that is accessible to the pilot/co-pilot, allowing the pilot/co-pilot to actuate the backup emergency cargo-release device in an emergency situation to generate a mechanical stimulus that causes the external cargo hook system to jettison the externally-attached cargo.

Many of today's medium- or heavy-lift utility helicopters that are engaged in external cargo-transport operations are configured so that the operation of the external cargo hook system is the responsibility of a flight crew member (as opposed to the pilot/co-pilot). This is a preferable scenario inasmuch as flight operations involving the transport of externally-attached cargo are typically high workload conditions for the pilot/co-pilot, and, to the extent that a crew member can assume the responsibility for operation of the external cargo hook system and the monitoring of the externally-attached cargo, the safer such flight operations will be. Under these circumstances, the mechanical emergency cargo-release device for the external cargo hook system must be configured so that such device can be actuated by a flight crew member from the helicopter cabin.

However, in today's environment of downsizing to effect cost savings, it is as likely as not that many flight operations involving the transport of externally-attached cargo by medium- and heavy-lift helicopters will be conducted without any crew member presence in the helicopter cabin. To accommodate this circumstance, the mechanical emergency cargo-release device for an external cargo hook system must be configured so that the device can also be actuated by the pilot/co-pilot from the cockpit. In addition, depending upon how the external cargo hook system is physically integrated in combination with the helicopter and how the mechanical emergency cargo-release device is physically integrated in combination with the external cargo hook system, it may be necessary to configure the mechanical emergency cargo-release device so that the elements of the cargo-release device that provide the cabin-actuation capability have a predefined functional independence with respect to the elements of the cargo-release device that provide the cockpit-actuation capability and vice-versa.

A need exists for a mechanical emergency cargo-release device for use in combination with a helicopter external cargo hook system that has a dual-release capability, i.e., can be independently actuated either by the pilot/co-pilot from the cockpit or by a crew member from the cabin to generate a mechanical stimulus that causes the external cargo hook system to jettison externally-attached cargo. The elements of such a mechanical emergency cargo-release device that provide the cabin-actuation capability should have a predefined functional independence from those elements of the cargo-release device that provide the cockpit-actuation capability and vice-versa.

DISCLOSURE OF THE INVENTION

One object of the present invention is to provide a mechanical emergency dual-release mechanism that is configured for use in combination with a helicopter external cargo hook system and that has a dual-release capability wherein the mechanism can be independently actuated either by the pilot/co-pilot from the cockpit or by a crew member in the cabin.

Another object of the present invention is to provide a mechanical emergency dual-release mechanism that is configured so that the elements of such cargo-release mechanism that provide the cabin-actuation capability have a predefined functional independence from those elements of the cargo-release mechanism that provide the cockpit-actuation capability.

A further object of the present invention is to provide a mechanical emergency dual-release mechanism that is configured so that the elements of such cargo-release mechanism that provide the cockpit-actuation capability have a predefined functional independence from those elements of the cargo-release mechanism that provide the cabin-actuation capability.

These and other objects of the invention are provided by a mechanical emergency dual-release mechanism according to the present invention for use in combination with a helicopter external cargo hook system that includes a cargo hook assembly that is operative to jettison an externally-attached cargo. The mechanical emergency dual-release mechanism comprises a pulley axle, a cockpit pulley assembly mounted in rotatable combination with the pulley axle, a cabin pulley assembly mounted in rotable combination with the pulley axle, the cabin pulley assembly being functionally interconnected to the cargo hook assembly and operative in response to a mechanical stimulus generated by means of the cockpit pulley assembly or the cabin pulley assembly to activate the cargo hook assembly to jettison the externally-attached cargo, and a displacement transfer means for operatively interconnecting the cockpit pulley assembly and the cabin pulley assembly.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

Figure 1:
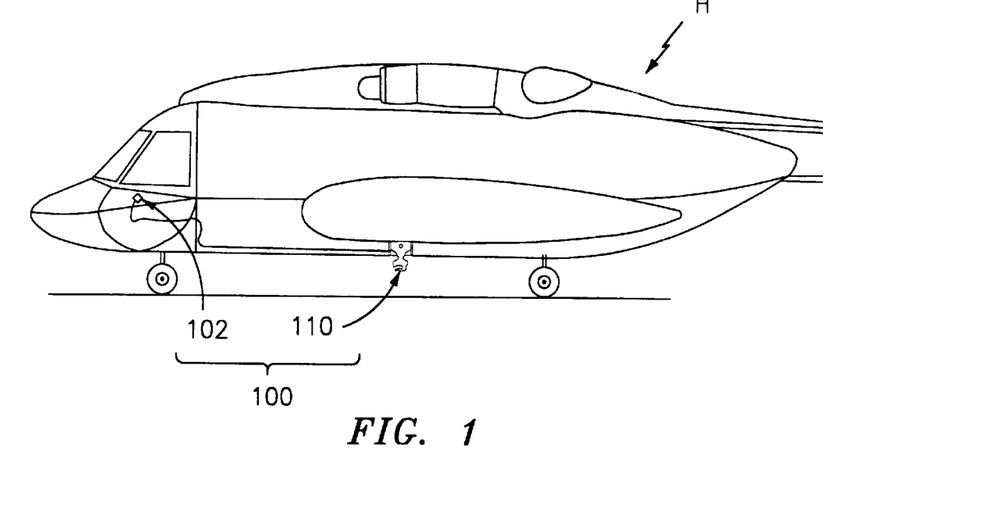
FIG. 1 illustrates an external cargo hook system integrated in combination with a helicopter.

Referring now to the drawings wherein like reference characters identify corresponding or similar elements throughout the several views, FIG. 1 exemplarily illustrates an external cargo hook system 100 as integrated in combination with a helicopter H. The external cargo hook system 100 comprises a primary emergency cargo-release subsystem 102 and a cargo hook assembly 110. The cargo hook assembly 110, described in further detail in subsequent paragraphs, is configured to allow cargo to be attached externally to the helicopter for transport thereof and to facilitate the immediate jettison of externally-attached cargo in the event of an emergency situation. The cargo hook assembly 110 is configured to accommodate cargo having a predetermined maximum weight, e.g., the described embodiment (for the S-92* helicopter being developed by the Sikorsky Aircraft Corporation—*S-92 is a trademark of the Sikorsky Aircraft Corporation) of the external hook system is design limited to cargo loads of about 4,520 kilograms (10,000 pounds), and to accommodate a predetermined range of longitudinal and/or lateral motion of the externally-attached cargo during flight operations. The primary emergency cargo-release subsystem 102 is an electrically operated subsystem, e.g., an electrically-actuated solenoid, that includes a cockpit actuation mechanism that is electrically interconnected to the cargo hook assembly 110. The primary emergency cargo-release subsystem 102 is operative to allow the flight crew, i.e., pilot or co-pilot, to actuate the cargo hook assembly 110 to immediately disengage the externally-attached cargo, i.e., jettison the externally-attached cargo, in an emergency situation.

The present invention is described with respect to external cargo hook systems 100 that are designed to allow the cargo hook assembly 110 be stowed within the helicopter airframe when the external cargo hook system 100 is not being utilized. Stowage of the cargo hook assembly 110 when not in use allows the helicopter H to be operated with a cleaner aerodynamic profile, i.e., less profile drag, thereby enhancing the operating efficiency of the helicopter H, e.g., higher operating flight speeds, lower fuel consumption. To accommodate the stowage of the cargo hook assembly 110, the structural airframe of the helicopter H is configured to provide a bay $B_C$ beneath the cabin floor for the cargo hook assembly 110 (see FIGS. 2A–2C). The bay $B_C$ includes an airframe opening $B_O$ (see FIG. 2B) through which the cargo hook assembly 110 protrudes when the external cargo hook system 100 is deployed to transport cargo. A removable bay cover $B_{CV}$ can be utilized to block the airframe opening $B_O$ when the cargo hook assembly 110 is in the stowed configuration. Access to the bay $B_C$ from the cabin of the helicopter H is provided by means of a removable floor panel $P_R$ (see FIG. 2A).

Figure 2A:
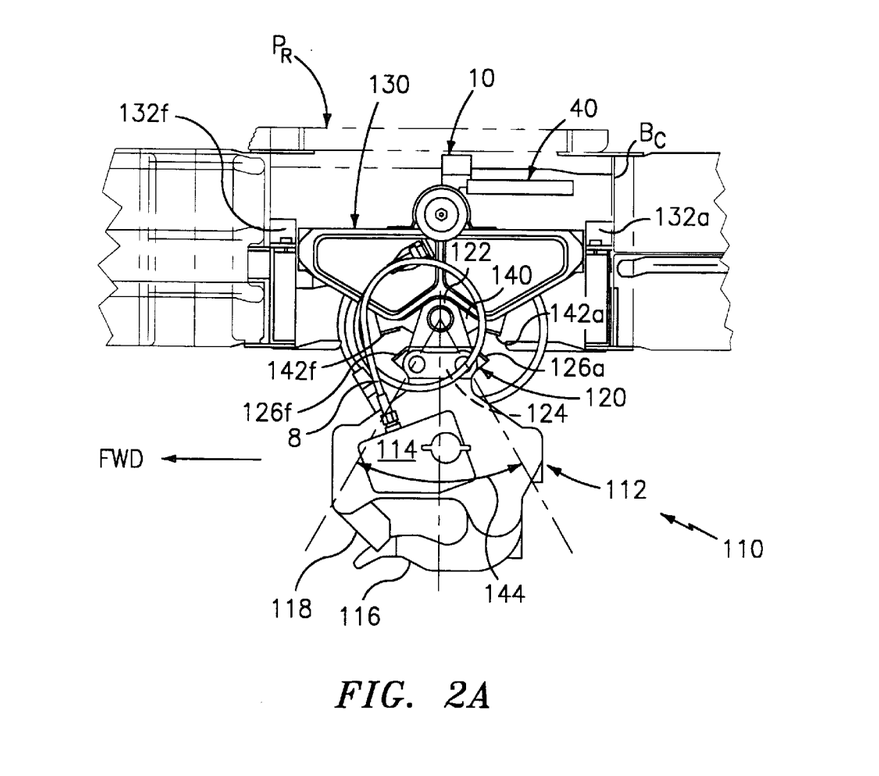
FIG. 2A is a side plan view of an exemplary embodiment of a cargo hook assembly of an external cargo hook system.
Figure 2B:
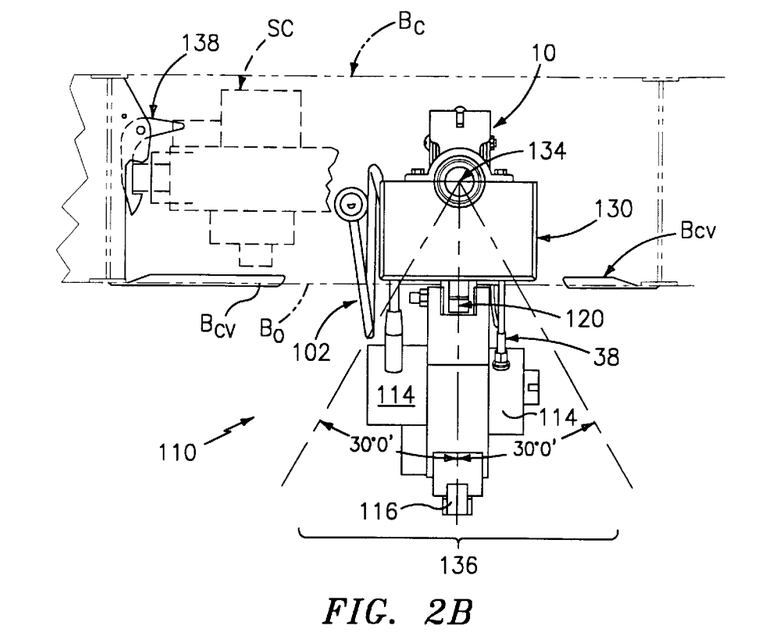
FIG. 2B is an end plan view (looking aftwardly) of the cargo hook assembly of FIG. 2A.
Figure 2C:
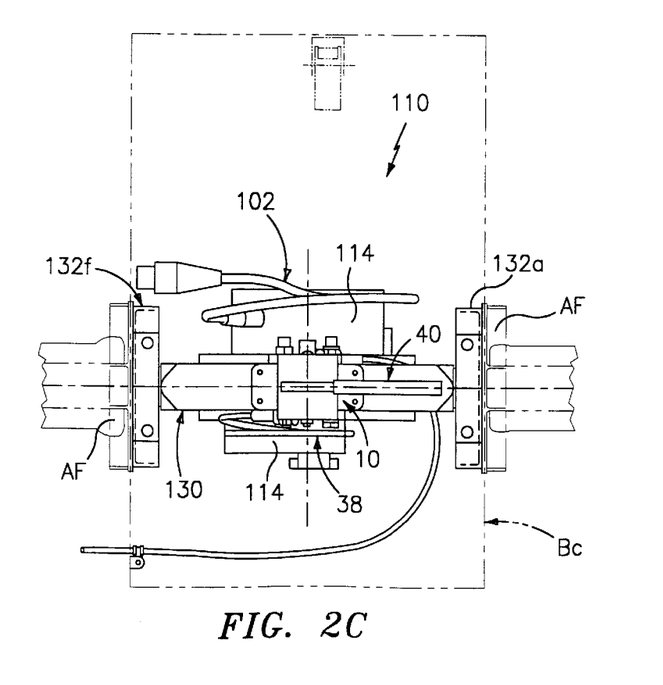
FIG. 2C is a top plan view of the cargo hook assembly of FIG. 2A.

An exemplary cargo hook assembly 110 is illustrated in FIGS. 2A, 2B, 2C and comprises a cargo hook 112, a swivel fitting 120, and a support trunnion 130. The support trunnion 130, which is operative to integrate the cargo hook assembly 110 in pivotable combination with the helicopter airframe AF, comprises forward and aft trunnion support fittings 132f, 132a, and a support shaft 134. The forward and aft trunnion support fittings 132f, 132a are rigidly secured in combination with the airframe AF of the helicopter. Alternatively, the forward and aft trunnion support fittings 132f, 132a may be fabricated as elements of the helicopter airframe. The support shaft 134 is integrated in pivotable combination with the forward and aft trunnion support fittings 132f, 132a so that the support trunnion 130 is laterally pivotable through a predetermined operating range during transport of externally-attached cargo. For the described embodiment, the lateral pivot range is ±30° (see reference numeral 136 in FIG. 2B).

Preferably, the cargo hook assembly 110 is further laterally pivotable to a stowage configuration (see reference characters SC in FIG. 2B) within the cabin bay $B_C$ and maintained in such stowage configuration by means of a hook lock-release lever 138 when the external cargo hook system 100 is not being utilized to transport cargo. Stowing the cargo hook assembly 110 in the cabin bay $B_C$ in this manner allows a helicopter to be operated with a cleaner aerodynamic configuration, thus reducing helicopter operating costs.

The support trunnion 130 further includes an interface segment 140 for integrating the swivel fitting 120 in pivotable combination with the support trunnion 130. The interface segment 140 includes forward and aft bumper stops 142f, 142a.

The swivel fitting 120 comprises a first interface segment 122, a second interface segment 124, and forward and aft bumper stops 126f, 126a. The first interface segment 122 has a configuration that is complementary to the interface segment 140 of the support trunnion 130 for mounting the swivel fitting 120 in pivotable combination with the support trunnion 130. The second interface segment 124 has a configuration that facilitates mounting of the cargo hook 112 in rigid combination with the swivel fitting 120. The forward and aft bumper stops 126f, 126a are configured and positioned to interact with the forward and aft bumper stops 142f, 142a of the support trunnion 130 to limit the forward and aft (longitudinal) pivotal movement of the swivel fitting 120, cargo hook 112 combination during transport of externally-attached cargo. For the described embodiment, the operating range for longitudinal pivotal movement of the swivel fitting 120, cargo hook 112 combination is ±30° (see reference character 144 in FIG. 2A).

The cargo hook 112 includes a disengage unit 114, a load beam 116, and a keeper 118. The load beam 116 is operative to facilitate the attachment of cargo in combination with the cargo hook assembly 110 for subsequent transport of such cargo. The keeper 118 mechanically interacts with the load beam 116 to preclude the attached cargo from inadvertently disengaging from the cargo hook assembly 110 during transport of such cargo.

The disengage unit 114 is a conventional electromechanical arrangement that interconnects the load beam 116 in combination with the cargo hook 112, and which is operative, in response to an electrical stimulus (from the primary emergency cargo-release subsystem) or a mechanical stimulus (from the mechanical emergency dual-release mechanism according to the present invention), to automatically disengage/jettison the load beam 116 from the cargo hook 112. The disengage unit 114 is electrically interconnected to the primary emergency cargo-release subsystem 102 (see FIGS. 2B, 2C) and is operative, when activated in response to a control signal (the electrical stimulus) from the subsystem 102, to automatically disengage/jettison the load beam 116, thereby causing the externally-attached cargo to be jettisoned from the helicopter H in an emergency situation. The disengage unit 114 is also mechanically interconnected to and operative, when activated in response to a mechanical stimulus from the mechanical emergency dual-release mechanism according to the present invention (as described hereinbelow in further detail), to automatically disengage/jettison the load beam 116, thereby causing the externally-attached cargo to be jettisoned from the helicopter H in an emergency situation.

Figure 3A:
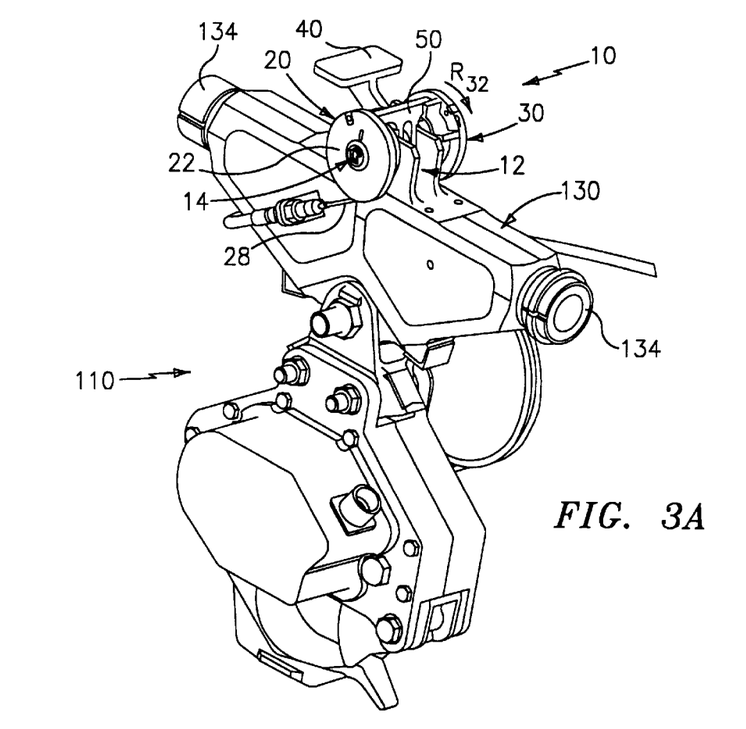
FIG. 3A is a perspective view of one embodiment of a mechanical emergency dual-release mechanism according to the present invention for use in combination with an external cargo hook system.
Figure 3B:
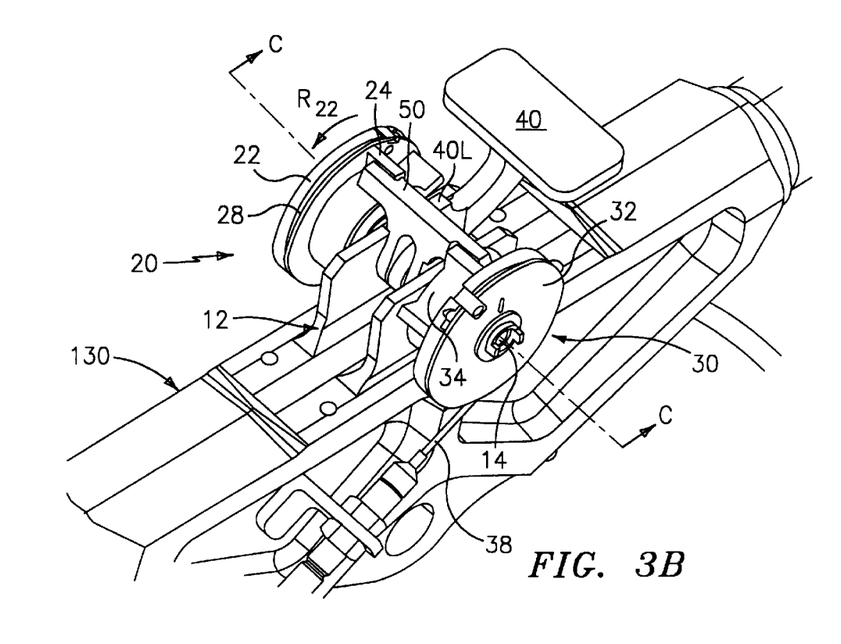
FIG. 3B is another perspective view of the embodiment of the mechanical emergency dual-release mechanism illustrated in FIG. 3A.
Figure 3C:
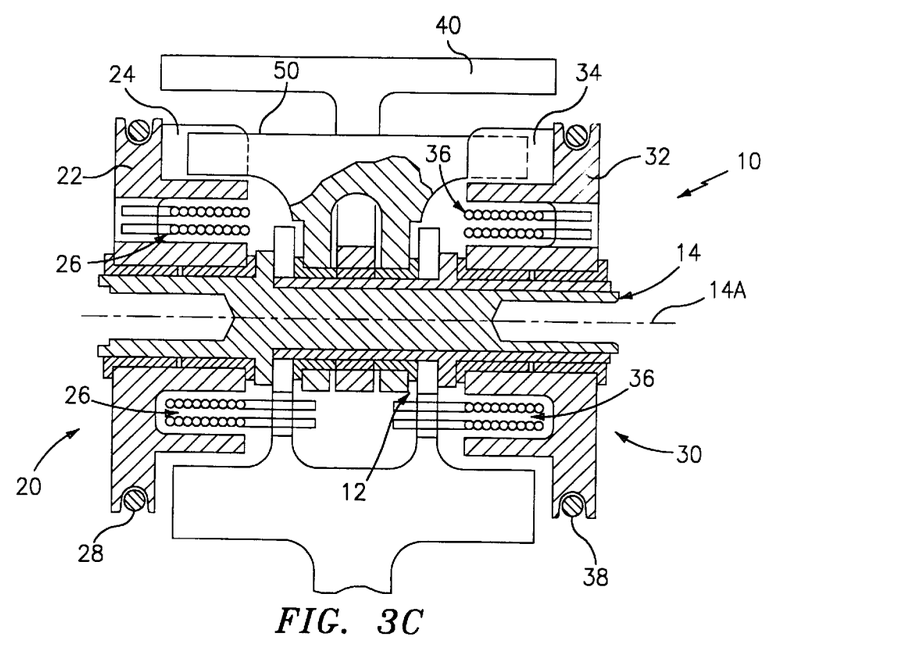
FIG. 3C is a cross-sectional view of the mechanical emergency dual-release mechanism of FIG. 3B taken along line C—C thereof.

One embodiment of a secondary emergency dual-release mechanism 10 according to the present invention for use in combination with an external cargo hook system 100 of the type described in the preceding paragraphs is exemplarily illustrated in FIGS. 3A–3C. The emergency dual-release mechanism 10 is a mechanical apparatus that comprises an interface member 12, a pulley axle 14, a cockpit pulley assembly 20, a cabin pulley assembly 30, and a coupler 50. This configuration allows the emergency dual-release mechanism 10 to be manually actuated by the pilot/co-pilot utilizing the cockpit pulley assembly 20 (a first mechanical stimulus) to activate the disengage unit 114, causing the externally-attached cargo to be jettisoned without mechanically dislocating the manual actuating means of the cabin pulley assembly 30. Conversely, this configuration allows the emergency dual-release mechanism 10 to be manually actuated by a crew member by means of the manual actuating means of the cabin pulley assembly 30 (the second mechanical stimulus) to activate the disengage unit 114, causing the externally-attached cargo to be jettisoned without mechanically dislocating the components comprising the cockpit pulley assembly 20.

The interface member 12 is configured for mounting the mechanical emergency dual-release mechanism 10 in rigid combination with the support trunnion 130 of the cargo hook assembly 110 (see, e.g., FIGS. 2A–2C). Alternatively, the support trunnion 130 can be configured to include an integral structural member that functions as an interface member for mounting the emergency dual-release mechanism 10 in rigid combination with the support trunnion 130. The pulley axle 14 is mounted in rigid combination with the interface member 12 and functions as a rotational/support surface for the cockpit and cabin pulley assemblies 20, 30.

The cockpit pulley assembly 20 comprises a cockpit pulley 22, an engagement lug 24, a pulley return spring 26 (see FIG. 3C), and a cockpit control cable 28. The cockpit pulley 22 is mounted in rotatable combination with the pulley axle 14 at one end thereof. The engagement lug 24 protrudes from the cockpit pulley 22 to mechanically engage the coupler 50. The engagement lug 24 may be formed as an integral element of the cockpit pulley 22, or may be fabricated as a separate component that is rigidly secured in combination with the cockpit pulley 22 by any suitable fastening technique known in the art.

The pulley return spring 26 is mechanically integrated in combination with the cockpit pulley 22 and the interface member 12 and operative to maintain the cockpit pulley 22 in a neutral (unactuated) position or state (see FIGS. 3A–3B which illustrate the neutral position/state of the mechanical emergency dual-release mechanism 10). The pulley return spring 26 is further operative to return the cockpit pulley 22 to the neutral position/state after actuation of the emergency dual-release mechanism 10 by the pilot or co-pilot. Return of the cockpit pulley 22 to the neutral position/state permits a signal to be transmitted to the cockpit to apprise the pilot/co-pilot of the current status of the external cargo hook system 100.

One end of the cockpit control cable 28 is secured in combination with the cockpit pulley 22, and the cockpit control cable 28 is routed through the helicopter H so that the other end thereof terminates in an actuating device, e.g., release handle (not shown), in the cockpit. Manual actuation of the cockpit release handle by the pilot or copilot results in a physical displacement of the cockpit control cable 28 that causes a corresponding rotation of the cockpit pulley 22 (see reference character $R_{22}$ in FIG. 3B) from the neutral state to an actuated position. Upon cessation of the manual actuation force by the pilot/co-pilot, the pulley return spring 26 is operative to bias the cockpit pulley 22 back to the neutral position.

The cabin pulley assembly 30 comprises a cabin pulley 32, an engagement lug 34, a pulley return spring 36, a cabin control cable 38, and a crew release lever 40. The cabin pulley 32 is mounted in rotatable combination with the pulley axle 14 at the other end thereof. The engagement lug 34 protrudes from the cabin pulley 32 to mechanically engage the coupler 50. The engagement lug 34 may be formed as an integral element of the cabin pulley 32, or may be fabricated as a separate component that is rigidly secured in combination with the cabin pulley 32 by any suitable fastening technique known in the art.

The pulley return spring 36 is mechanically integrated in combination with the cabin pulley 32 and the interface member 12 and operative to maintain the cabin pulley 32 in a neutral (unactuated) position or state (see FIGS. 3A. 3B). The pulley return spring 36 is further operative to return the cabin pulley 32 to the neutral position/state after actuation of the emergency dual-release mechanism 10 by a crew member. Return of the cabin pulley 32 to the neutral position/state permits a signal to be transmitted to the cockpit to apprise the pilot/co-pilot of the current status of the external cargo hook system 100.

One end of the cabin control cable 38 is secured in combination with the cabin pulley 32, and the cabin control cable 38 is routed to the cargo hook assembly 110 so that the other end thereof terminates in the disengage unit 114 of the cargo hook 112 (see FIGS. 2A–2C). Mechanical actuation of the crew release lever 40 by a crew member (a counter-clockwise rotation for the described embodiment—see FIG. 3B), which is the second mechanical stimulus described hereinabove, causes a corresponding rotation of the cabin pulley 32 (see reference character $R_{32}$ in FIG. 3A) from the neutral state to an actuated position. Rotation of the cabin pulley 32 to the actuated position results in a physical displacement of the cabin control cable 38 that causes the activation of the disengage unit 114 to jettison the externally-attached cargo. Upon cessation of the manual actuation force by the crew member, the pulley return spring 36 is operative to bias the cabin pulley 32 back to the neutral position.

The crew release lever 40 is mounted in rotatable combination with the pulley axle 14, i.e., the axis of rotation of the crew actuation lever 40 coincides with the axis 14A of the pulley axle 14 (see FIG. 3C). The crew release lever 40 includes an engagement lug 40L that mechanically engages the coupler 50 with the mechanical emergency dual-release mechanism 10 in the neutral position. The coupler 50 is also mounted in rotatable combination with the pulley axle 14.

Operation of the mechanical emergency dual-release mechanism 10 according to the present invention is as follows. Manual actuation of the cockpit release handle by the pilot/co-pilot causes rotation $R_{22}$ of the cockpit pulley 22 due to the physical displacement of the cockpit control cable 28. Since the engagement lug 24 of the cabin pulley 22 is in mechanical engagement with the coupler 50, rotation of the cockpit pulley 22 causes a corresponding rotation of the coupler 50. Due to the mechanical engagement between the engagement lug 34 of the cabin pulley 32 and the coupler 50, rotation of the coupler 50 causes a corresponding rotation $R_{32}$ of the cabin pulley 32.

Rotation of the cabin pulley 32 results in the physical displacement of the cabin control cable 38 that causes the activation of the disengage unit 114, resulting in the jettisoning of the externally attached cargo. Rotation of the coupler 50 in the foregoing manner results in the mechanical disengagement of the coupler 50 from the engagement lug 40L of the crew release lever 40, thereby ensuring that there is no physical dislocation of the crew release lever 40 when the emergency dual-release mechanism 10 is actuated from the cockpit. This is an important feature of the mechanical emergency dual-release mechanism 10 according to the present invention as an examination of FIG. 2A reveals.

An examination of FIG. 2A shows that, due to the positioning of the cargo hook assembly 110 within the cabin bay $B_C$, and the manner in which the mechanical emergency dual-release mechanism 10 is physically integrated in combination with the cargo hook assembly 110, proper functioning of the mechanical emergency cargo-release mechanism could be precluded upon actuation of the mechanical emergency release mechanism by means of the cockpit if the crew release lever were rigidly secured in combination with the coupler inasmuch as the complete rotation of the crew release lever to the actuated position would be prevented by the removable floor panel $P_R$.

That is, the crew release lever would impact the removable floor panel $P_R$ before the crew release lever had fully rotated to the actuated position. The impact of the crew release lever with the removable floor panel $P_R$ would prevent the cabin pulley from fully rotating to the actuated position, and this in turn, would preclude activation of the disengage unit 114 of the cargo hook assembly 110. In circumstances where the mechanical emergency release mechanism is being actuated from the cockpit, i.e., no crew members present in the cabin, it is likely that the removable floor panel $R_P$ would be secured in place such that the foregoing scenario is a high probability event for a mechanical emergency release system where the crew release lever is secured in combination with the coupler.

The mechanical emergency dual-release mechanism 10 according to the present invention, as described herein, negates the possibility of improper functioning of the mechanism 10 as a result of mechanical functioning of the crew release lever 40 as described hereinabove.

Manual actuation of the crew release lever 40 by a crew member (rotational motion in the same directional sense as $R_{32}$ as illustrated in FIG. 3A) causes a corresponding rotation of the coupler 50 due to the mechanical engagement between the engagement lug 40L of the crew release lever 40 and the coupler 50. Due to the mechanical engagement between the engagement lug 34 of the cabin pulley 32 and the coupler 50, rotation of the coupler 50 causes a corresponding rotation $R_{32}$ of the cabin pulley 32. Rotation of the cabin pulley 32, in turn, results in the physical displacement of the cabin control cable 38 that causes the activation of the disengage unit 114, resulting in the jettisoning of the externally-attached cargo. Rotation of the coupler 50 as heretofore described results in the mechanical disengagement of the coupler 50 from the engagement lug 24 of the cockpit pulley 22, thereby ensuring that there is no physical dislocation of the cockpit control cable 28 when the emergency dual-release mechanism 10 is actuated from the cabin by means of the crew release lever 40.

Figure 4A:
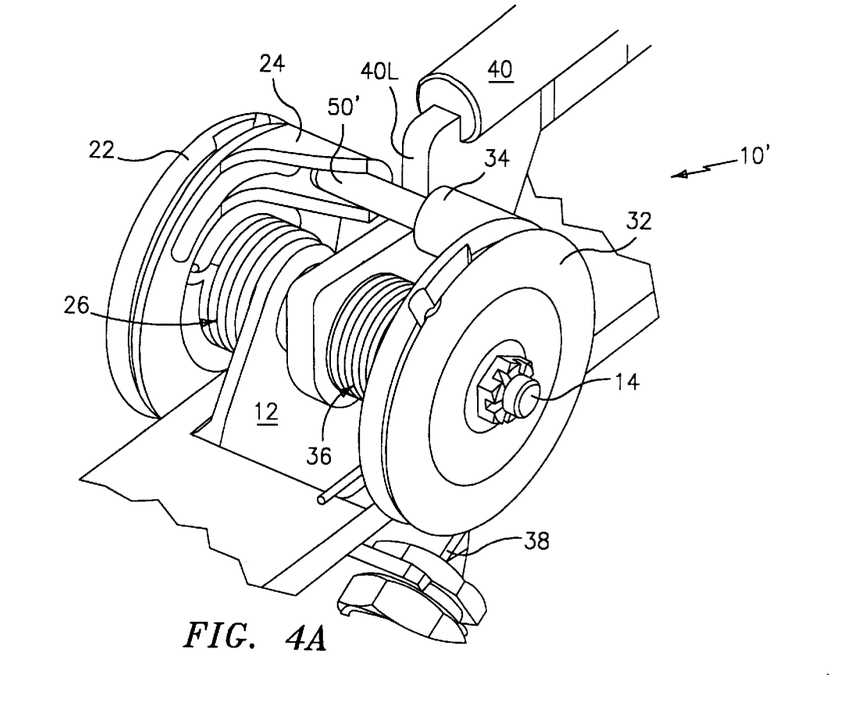
FIG. 4A is a perspective view of another embodiment of a mechanical emergency dual-release mechanism according to the present invention (in the neutral position).
Figure 4B:
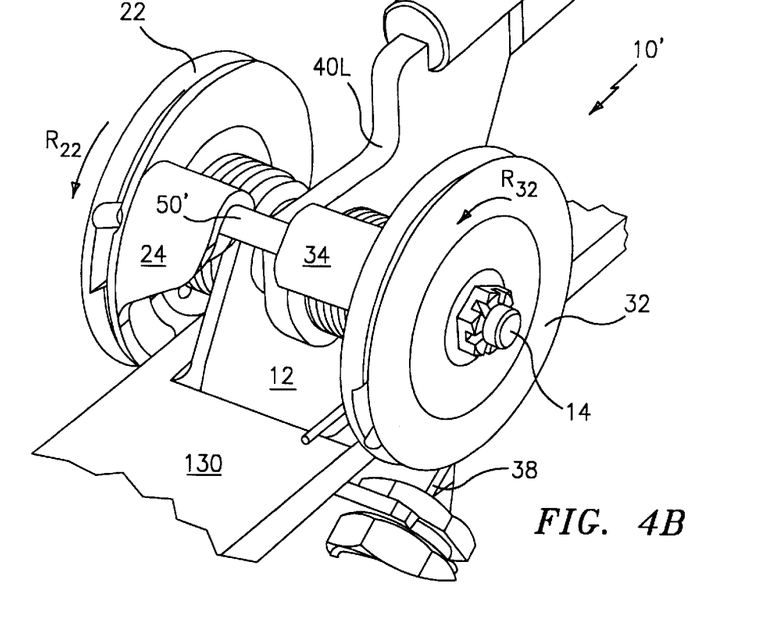
FIG. 4B is another perspective view of the embodiment of the mechanical emergency dual-release mechanism of FIG. 4A illustrating the actuated position as a result of actuation by means of the cockpit pulley assembly of the dual-release mechanism.
Figure 4C:
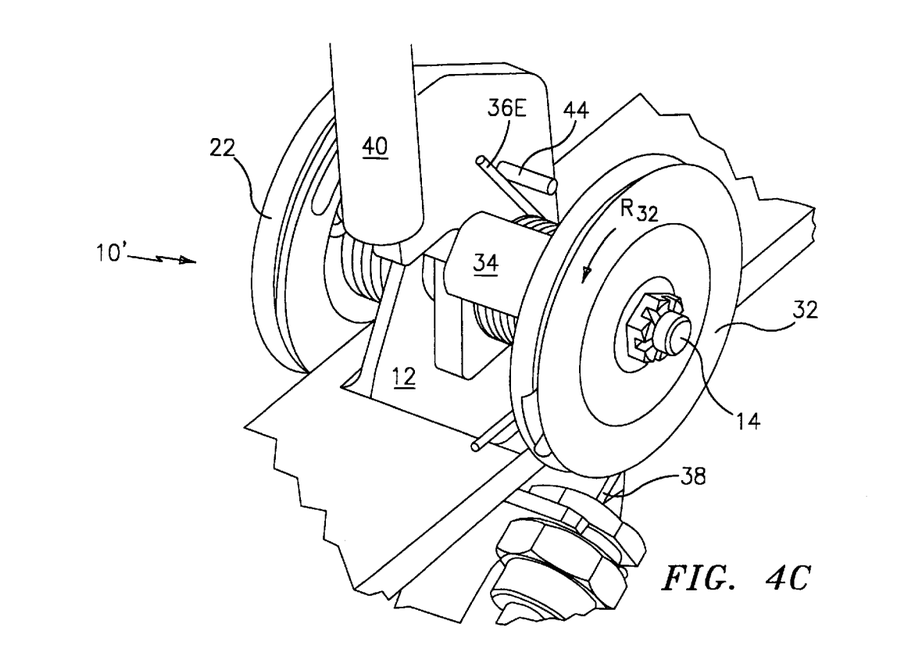
FIG. 4C is another perspective view of the embodiment of the mechanical emergency dual-release mechanism of FIG. 4A illustrating the actuated position as a result of actuation by means of the cabin pulley assembly of the dual-release mechanism.

Another embodiment of a mechanical emergency dual-release mechanism 10' according to the present invention is exemplarily illustrated in FIGS. 4A–4C. This embodiment of the mechanical emergency dual-release mechanism 10' is functionally equivalent to the embodiment of the mechanical emergency dual-release mechanism 10 described in the preceding paragraphs. Structurally, this embodiment of the mechanical emergency dual-release mechanism 10' is similar to the mechanical emergency dual-release mechanism 10 described hereinabove with one primary structural difference. In lieu of the coupler 50 described hereinabove, the mechanical emergency dual-release mechanism 10' includes a press pin 50'.

With reference to FIG. 4A, the press pin 50' is integrated in combination with the engagement lug 34 of the cabin pulley 32 and is configured to mechanically engage the engagement lug 24 of the cockpit pulley 20 with the mechanical emergency dual-release mechanism 10' in the neutral position. The press pin 50' may be fabricated as an integral element of the engagement lug 34, or alternatively, may be fabricated as a separate component that is integrated in rigid combination with the engagement lug 34 by an suitable conventional fastening technique. When the cockpit pulley 22 is rotated to the actuation position (see FIG. 4B) by manual actuation of the cockpit release handle, the mechanical engagement between the engagement lug 24 of the cockpit pulley 22 and the press pin 50' causes a corresponding rotation of the cabin pulley 32 and subsequent activation of the disengage unit 114 of the cargo hook assembly 110 to jettison the externally-attached cargo.

In contrast, when the cabin release lever 40 is rotated to the actuation position (see FIG. 4C), causing a corresponding rotation of the cabin pulley 32 and subsequent activation of the disengage unit 114 of the cargo hook assembly 110 to jettison the externally-attached cargo, such rotation of the cabin release lever 40 causes the press pin 50' to be mechanically disengaged from the engagement lug 24 of the cockpit pulley 22. Thus, rotation of the cabin release lever 40 does not induce any physical dislocation of the cockpit control cable 28.

From the foregoing description, it should be evident that the press pin 50' of the mechanical emergency dual-release mechanism 10' is functionally equivalent to the coupler 50 of the mechanical emergency dual-release mechanism 10. Both the coupler 50 and the press pin 50' are operative to provide a displacement transfer function for the mechanisms 10, 10', respectively. That is, for the mechanisms 10, 10', the rotational displacement of either the cockpit pulley 22 or the crew release lever 40 is transferred by means of the press pin 50' or the coupler 50, respectively, to the cabin pulley 32, causing a corresponding rotational displacement thereof, and ultimately, activation of the disengage unit 114 to jettison the externally-attached cargo.

One other structural difference between the embodiments of the mechanical emergency dual-release mechanisms 10', 10 is the fact that the pulley return spring 36 of the cabin pulley assembly 30 is integrated in combination with the crew release lever 40 in the mechanical emergency dual-release mechanism 10'. With reference to FIG. 4C, one end 36E of the pulley return spring 36 is disposed in mechanical engagement with a lever lug 44. Thus, the pulley return spring 36 of the mechanical emergency dual-release mechanism 10' also exerts a biasing force against the crew release lever 40 such that the crew release lever 40 is actively biased back to the neutral position (in contrast to the mechanical emergency dual-release mechanism 10 wherein the crew release lever 40 is passively biased back to the neutral position by means of the cabin pulley 32 acting through the mechanically engaged combination of the engagement lug 34 and the coupler 50).

Figure 5:
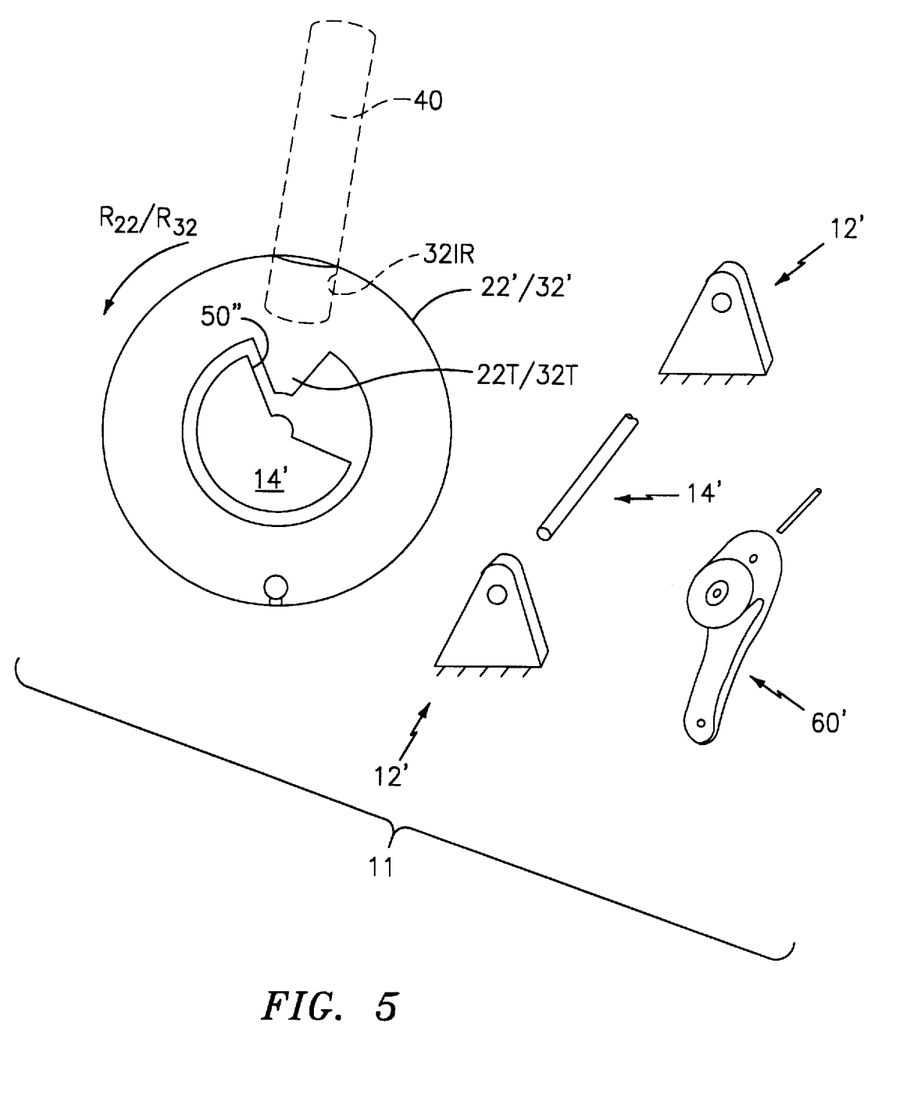
FIG. 5 is a schematic illustration of an alternative embodiment of a mechanical emergency dual-release mechanism according to the present invention.

A further embodiment of a mechanical emergency dual-release mechanism 11 is schematically illustrated in FIG. 5. This embodiment is discernibly different, both from a structural and functional perspective, from the embodiments of the mechanical emergency dual-release mechanism described above, although the end functional result of the mechanical emergency dual-release mechanism 11 is the activation of the disengage unit 114 of the cargo hook assembly 110 to jettison an externally-attached cargo.

The mechanical emergency dual-release mechanism 11 comprises support brackets 12', a pulley shaft 14', a cockpit pulley 22', a cabin pulley 32', and an output crank 60'. The support brackets 12' are structurally and functionally equivalent to the interface member 12 described hereinabove, being configured for mounting the mechanical emergency dual-release mechanism 11 in rigid combination with the support trunnion 130. The pulley shaft 14' of this embodiment is a dual purpose component, functioning as: (1) the rotational support for the cockpit and cabin pulleys 22', 32'; and (2) the displacement transfer mechanism that transfers the rotational displacement of either the cockpit pulley 22' or the cabin pulley' to the output crank 60 for activation of the cargo hook assembly 110 to jettison an externally-attached cargo.

The pulley shaft 14' is mounted in rotatable combination with the support brackets 12'. The pulley shaft 14' has a partially-circular cross-sectional configuration and includes a transfer surface 50'' that provides a displacement transfer function similar to the coupler 50 or press pin 50' described hereinabove. The cockpit and cabin pulleys 22', 32' are mounted in rotatable combination with the pulley shaft 14'. In lieu of the engagement lugs 24, 34 described hereinabove, each pulley 22', 32' is fabricated to include an internal engagement tang 22T, 32T, respectively, that mechanically engages the transfer surface 50'' of the pulley shaft 14' with the mechanical emergency dual-release mechanism 11 in the neutral position. The cabin pulley 32' is further configured to include an integration receptacle 32IR for attaching the crew release lever 40 in combination with the cabin pulley 32' (the crew release lever 40 may be detached from the cabin pulley 32' when the helicopter is being operated without crew members).

The cockpit pulley 22' is integrated in combination with a cockpit control cable and a pulley return spring as described hereinabove. The cabin pulley 32', in contrast, is only integrated in combination with a pulley return spring as described hereinabove. The cabin control cable described hereinabove is secured in combination with the output crank 60' as described in the following paragraph.

The output crank 60' is secured in rigid combination with one end of the pulley shaft 14' so that rotation of the pulley shaft 14' causes a corresponding rotation of the output crank 60'. One end of the cabin control cable is secured in combination with the output crank 60' and the other end of the cabin control cable terminates in the disengage unit 114 of the cargo hook assembly 110.

Manual actuation of the cockpit release handle by the pilot/co-pilot causes rotation $R_{22}$ of the cockpit pulley 22' due to the physical displacement of the cockpit control cable. Due to the mechanical engagement between the internal engagement tang 22T and the transfer surface 50", the rotational displacement of the cockpit pulley 22' causes a corresponding rotational displacement of the pulley shaft 14'. Rotation of the pulley shaft 14' causes a corresponding rotation of the output crank 60', which in turn, causes a physical displacement of the cabin control cable that causes the activation of the disengage unit 114 to jettison the externally-attached cargo. The rotation of the pulley shaft 14' as described hereinabove results in the mechanical disengagement between the internal engagement lug 32T of the cabin pulley 32' and the transfer surface 50" of the pulley shaft 14', thereby ensuring that there is no physical dislocation of the cabin pulley 32' (or the crew release lever 40).

Manual actuation of the crew release lever 40 by a crew member causes rotation $R_{32}$ of the cabin pulley 32'. Due to the mechanical engagement between the internal engagement tang 32T and the transfer surface 50", the rotational displacement of the cabin pulley 32' causes a corresponding rotational displacement of the pulley shaft 14'. Rotation of the pulley shaft 14' causes a corresponding rotation of the output crank 60', which in turn, induces a physical displacement of the cabin control cable that causes the activation of the disengage unit 114 to jettison the externally-attached cargo. The rotation of the pulley shaft 14' as described hereinabove results in the mechanical disengagement between the internal engagement lug 22T of the cockpit pulley 22' and the transfer surface 50" of the pulley shaft 14', thereby ensuring that there is no physical dislocation of the cockpit pulley 22' (or cockpit control cable and/or the cockpit release handle).

A variety of modification and variations of the present invention are possible in light of the above teachings. For example, one skilled in the art will appreciate that there is no structural or functional requirement to physically mount the mechanical emergency dual-release mechanism according to the present invention in rigid combination with the cargo hook assembly (support trunnion) as described hereinabove, although from a design and operational perspective, it is more expeditious to do so. It is therefore to be understood that, within the scope of the appended claims, the present invention may be practiced otherwise than as specifically described hereinabove.

What is claimed is:

1. A mechanical emergency dual-release mechanism for use in combination with a helicopter external cargo hook system that includes a cargo hook assembly that is operative to jettison an externally-attached cargo, comprising:
   a pulley axle;
   a cockpit pulley assembly mounted in rotatable combination with said pulley axle;
   a cabin pulley assembly mounted in rotatable combination with said pulley axle, said cabin pulley assembly being functionally interconnected to the cargo hook assembly and operative in response to a mechanical stimulus generated by means of said cockpit pulley assembly or said cabin pulley assembly to activate the cargo hook assembly to jettison the externally-attached cargo; and
   displacement transfer means for operatively interconnecting said cockpit pulley assembly and said cabin pulley assembly.

2. The mechanical emergency dual-release mechanism of claim 1 wherein said cockpit pulley assembly comprises:
   a cockpit pulley mounted in rotatable combination with said pulley axle;
   said cockpit pulley including an engagement lug in mechanical engagement with said displacement transfer means with said mechanical emergency dual-release mechanism in a neutral position;
   a pulley return spring disposed in operative combination with said cockpit pulley; and
   a cockpit control cable having one end thereof secured in combination with said cockpit pulley and the other end thereof terminating in a cockpit release handle in the helicopter cockpit.

3. The mechanical emergency dual-release mechanism of claim 1 wherein said cabin pulley assembly comprises:
   a cabin pulley mounted in rotatable combination with said pulley axle;
   said cabin pulley including an engagement lug in mechanical engagement with said displacement transfer means with said mechanical emergency dual-release mechanism in a neutral position;
   a pulley return spring disposed in operative combination with said cabin pulley;
   a cabin control cable having one end thereof secured in combination with said cabin pulley and the other end thereof terminating in operative combination with the cargo hook assembly; and
   a crew release lever mounted in rotatable combination with said pulley axle, said crew release lever including an engagement lug in mechanical engagement with said displacement transfer means with said mechanical emergency dual-release mechanism in a neutral position.

4. The mechanical emergency dual-release mechanism of claim 2 or 3 wherein said displacement transfer means comprises a coupler mounted in rotatable combination with said pulley axle.

5. The mechanical emergency dual-release mechanism of claim 3 wherein said displacement transfer means comprises a press pin integrated in combination with said engagement lug of said cabin pulley.

6. The mechanical emergency dual-release mechanism of claim 1 wherein said displacement transfer means comprises a coupler mounted in rotable combination with said pulley axle and in mechanical engagement with said cockpit pulley assembly and said cabin pulley assembly with said mechanical emergency dual-release mechanism in a neutral position.

7. The mechanical emergency dual-release mechanism of claim I wherein said displacement transfer means comprises a press pin integrated in combination with said cabin pulley assembly and in mechanical engagement with said cockpit pulley assembly with said mechanical emergency dual-release mechanism in a neutral position.

8. The mechanical emergency dual-release mechanism of claim 1 further comprising an interface member for mounting said mechanical emergency dual-release mechanism in rigid combination with the cargo hook assembly.

9. A mechanical emergency dual-release mechanism for use in combination with a helicopter external cargo hook system that includes a cargo hook assembly operative to jettison an externally-attached cargo, comprising:

a pulley axle;

a cockpit pulley mounted in rotatable combination with said pulley axle;

a cockpit pulley actuation device adapted to rotate said cockpit pulley;

a cabin pulley mounted in rotatable combination with said pulley axle; and a cabin pulley actuation device adapted to rotate said cabin pulley;

wherein said cabin pulley is mechanically interconnected with the cargo hook assembly and operative in response to actuation of either said cockpit pulley actuation device or said cabin pulley actuation device to activate the cargo hook assembly to jettison the eternally-attached cargo, and wherein said cockpit pulley and said cabin pulley are mechanically interconnected such that rotation of said cockpit pulley causes rotation of said cabin pulley without causing displacement of said cabin pulley actuation device.

10. The emergency dual-release mechanism of claim 9 further comprising a coupler disposed between the cockpit pulley and the cabin pulley, wherein said cockpit pulley includes a first lug and said cabin pulley includes a second lug, and wherein the mechanical interconnection between said cockpit pulley and said cabin pulley is provided by engagement between said first lug, said coupler and said second lug.

* * * * *